United States Patent [19]

St. Laurent et al.

[11] Patent Number: 5,038,687

[45] Date of Patent: Aug. 13, 1991

[54] MULTIPURPOSE RAILROAD FREIGHT CAR

[75] Inventors: Donat L. St. Laurent, Golden Valley, Minn.; James T. Brown, Central City, Pa.

[73] Assignee: Bethlehem Steel Corporation, Bethlehem, Pa.

[21] Appl. No.: 82,394

[22] Filed: Aug. 6, 1987

[51] Int. Cl.$^5$ ............................................. B61D 17/10
[52] U.S. Cl. .................................... 105/355; 105/422
[58] Field of Search ................... 105/359, 355, 238.1, 105/243, 422, 375; 410/68; 414/525 R, 525 B, 509, 510, 511, 512, 513, 521, 523, 526, 527, 528, 529; 198/550.01, 550.13, 568, 750

[56] References Cited

U.S. PATENT DOCUMENTS

| | | | |
|---|---|---|---|
| 157,481 | 12/1874 | Power | 105/243 |
| 252,830 | 1/1882 | Wilson | 105/243 |
| 371,224 | 10/1887 | Souder | 105/243 |
| 652,929 | 7/1900 | Souder | 105/243 |
| 669,876 | 3/1901 | Critchlow | 105/243 |
| 820,240 | 5/1907 | Mulock | 105/243 |
| 1,000,828 | 8/1911 | Lorillard | 144/242 J |
| 1,019,911 | 3/1912 | Otis | 105/243 |
| 1,067,719 | 7/1913 | Curry | 105/243 |
| 1,452,139 | 4/1923 | Bailey | 239/679 |
| 2,186,700 | 1/1940 | Johnson | 105/243 |
| 2,629,504 | 2/1953 | Peterson | 2/113 |
| 2,644,594 | 7/1953 | Komuchar | 414/525 R |
| 2,911,119 | 11/1959 | Kuhnau | 414/513 |
| 2,973,856 | 3/1961 | Brooks | 198/776 |
| 3,087,759 | 4/1963 | Worster | 105/243 |
| 3,273,728 | 9/1956 | Kelso | 414/513 |
| 3,282,456 | 11/1966 | Hawes | 414/523 |
| 3,476,272 | 11/1969 | Puta | 414/323 |
| 3,481,647 | 12/1969 | Cook | 298/24 |
| 3,578,186 | 5/1971 | Thomas | 414/513 |
| 3,595,175 | 7/1971 | Austill | 105/243 |
| 4,143,760 | 3/1979 | Hallstrom | 198/750 |
| 4,144,963 | 3/1979 | Hallstrom | 198/750 |
| 4,161,255 | 7/1979 | Ropert | 414/323 |
| 4,184,587 | 1/1980 | Hallstrom | 198/750 |
| 4,474,285 | 10/1984 | Foster | 198/750 |
| 4,478,155 | 10/1984 | Cena | 105/355 |
| 4,492,303 | 1/1985 | Foster | 198/750 |
| 4,508,211 | 3/1985 | Foster | 198/750 |
| 4,518,303 | 5/1985 | Moser | 414/528 |
| 4,571,150 | 2/1986 | Foster | 414/786 |
| 4,580,678 | 3/1986 | Foster | 198/750 |
| 4,611,708 | 10/1986 | Foster | 198/750 |

OTHER PUBLICATIONS

Brochure—"Keith Walking Floor"—Nov., 1984.

Primary Examiner—Richard A. Bertsch
Assistant Examiner—Eugene L. Szczecina, Jr.
Attorney, Agent, or Firm—John I. Iverson

[57] ABSTRACT

A multipurpose railroad freight car suitable for carrying either bulk freight or granular freight. The floor of the freight car comprises a pair of opposed, reversible conveyors. Also disclosed is a transverse wiper bar to guide the granular freight along the floor of the freight car to a central discharge chute.

6 Claims, 3 Drawing Sheets

MULTIPURPOSE RAILROAD FREIGHT CAR

BACKGROUND OF THE INVENTION

This invention relates to railroad freight cars. It relates particularly to a multipurpose freight car adapted to carry both bulk and palleted freight or grain.

Most railroad freight cars are designed and built to carry a single commodity. For example, hopper cars designed to carry coal are not suitable for carrying cement and vice versa. As a result, single commodity freight cars frequently travel empty between ladings and do not produce freight revenue for the railroads.

The idea of a multipurpose freight car capable of carrying several different commodities has been considered many times over the past 100 years as shown by the United States patents listed below:

U.S. Pat. No. 157,481—Power (1874)
U.S. Pat. No. 252,830—Wilson (1882)
U.S. Pat. No. 371,224—Souder (1887)
U.S. Pat. No. 652,929—Souder (1900)
U.S. Pat. No. 669,876—Critchlow (1901)
U.S. Pat. No. 820,240—Mulock (1906)
U.S. Pat. No. 1,019,911—Otis (1912)
U.S. Pat. No. 1,067,719—Curry (1913)
U.S. Pat. No. 2,186,700—Johnson (1940)
U.S. Pat. No. 3,087,759—Worster (1963)
U.S. Pat. No. 3,595,175—Austill (1971)
U.S. Pat. No. 4,478,155—Cena (1984)

None of these previous multipurpose freight cars were successful due primarily to the difficulties in loading and unloading the different commodities.

SUMMARY OF THE INVENTION

It is therefore an object of this invention to provide a multipurpose freight car adaptable for carrying either bulk freight or grain.

It is a further object of this invention to provide a multipurpose freight car that is easy to load and unload.

It has been discovered that the foregoing objectives can be attained by a multipurpose enclosed railroad freight car comprising a structural undercarriage mounted on trucks, a pair of sidewalls, a pair of end walls, a roof and a floor, the floor comprising a pair of opposed, reversible conveyors.

DESCRIPTION OF THE PREFERRED EMBODIMENT

Figure 1:
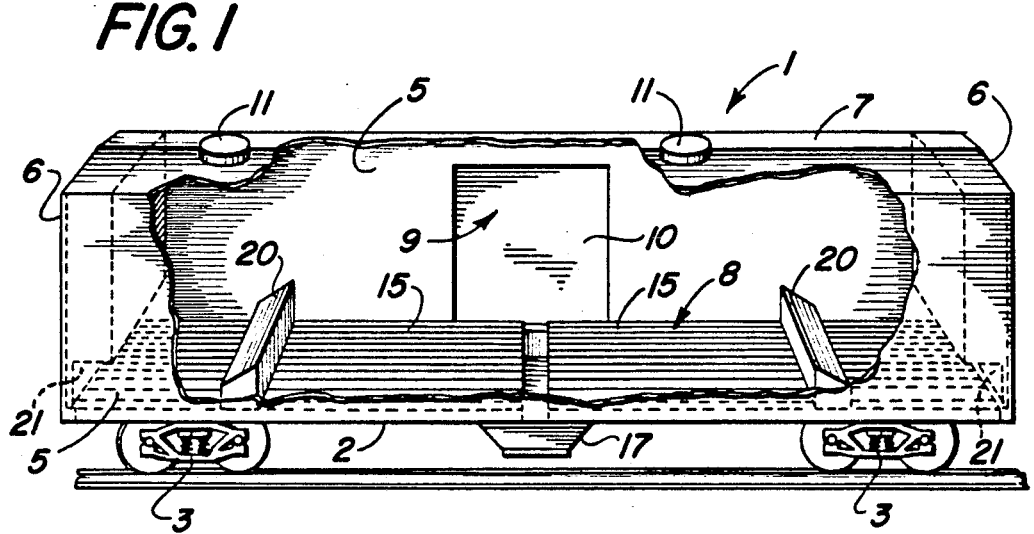
FIG. 1 is a perspective and partially sectional railroad freight car of this invention in which the exterior is of the general shape of a standard railroad boxcar.

The preferred embodiment of the multipurpose railroad freight car of this invention is shown in FIG. 1. The freight car 1 externally closely resembles the general shape and construction of a standard boxcar and comprises a structural undercarriage 2 mounted on trucks 3, a pair of sidewalls 5, a pair of end walls 6, a roof 7 and a floor 8. The sidewalls 5 are provided with a side opening 9 fitted with a plug type sliding door 10 to permit the loading and unloading of bulk freight. The roof 7 is provided with a plurality of roof hatches 11 to permit the loading to grain or other granular materials.

Figure 2:
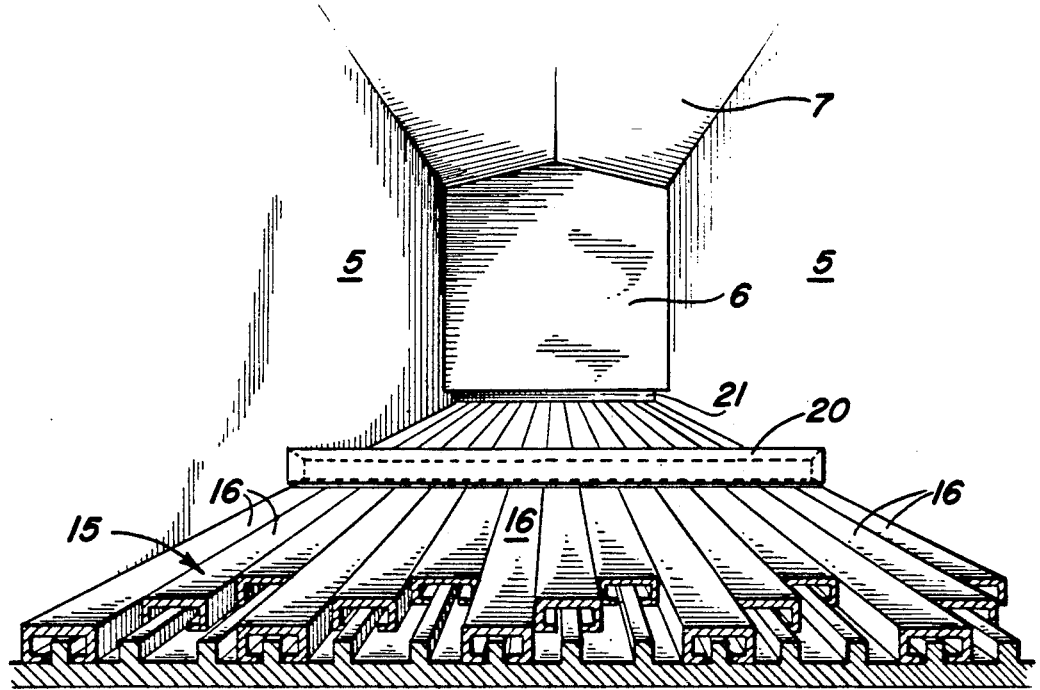
FIG. 2 is a perspective sectional view taken across the freight car of this invention at substantially floor level to illustrate one embodiment of this invention.

The unique floor of the freight car of this invention is comprised of a pair of opposed reversible conveyors 15 that facilitate the loading and unloading of the bulk freight and the unloading of the grain. I prefer to use conveyors of the type described in U.S. Pat. Nos. 4,474,285; 4,492,303; 4,508,211; 4,571,150; 4,580,678; and 4,611,708 to R. K. Foster, which are known as reciprocating floor conveyors. Reciprocating floor conveyors consist of a plurality of longitudinal floor planks 16 as illustrated in FIG. 2, that are sequentially and successively moved in a longitudinal direction by a plurality of hydraulic cylinders under the floor planks 16.

The type of reciprocating floor described in the above-mentioned Foster patents arranges the longitudinal floor planks 16 into three groups, with every third plank across the width o the floor being in the same group. The full cycle of movement of this type of conveyor by three coacting hydraulic cylinders is divided into the following four phases.

In Phase 1, the hydraulic cylinder for the first group moves the first group of floor planks 16 toward end walls 6 about 6 inches. The floor planks in groups two and three remain stationary. The load also remains stationary in its place on top of the planks 16.

In Phase 2, after the action of the first group of planks is completed, the hydraulic cylinder for the second group starts and pushes the second group of planks 16 toward end walls 6 about 6 inches. The floor planks in groups one and three remain stationary, along with the load.

In Phase 3, after the action of the second group of planks is completed, the hydraulic cylinder for the third group starts, pushing the third group of planks 16 toward end walls 6 about 6 inches. The floor planks in groups one and two are now at a standstill as is the load.

Finally, in Phase 4, once the movement of the third group is ended, all three groups of floor planks 16 go back 6 inches, moving the load about 6 inches to center of car. The complete cycle is then repeated until the load reaches the desired location.

While the reciprocating floor conveyor has been used for trailer trucks and stationary transfer installations, such conveyors were used only for end discharge vehicles and installations.

We have discovered that if two of these conveyors 15 are installed as the floor of the freight car, one on each side of the center doors, and operated in concert to move freight either toward or away from the center of the car, they form a very effective system for quickly and easily loading or unloading a railroad freight car with a variety of commodities, including grain.

To load bulk material in the freight car of this invention, the bulk material, such as palleted lumber, is loaded into the freight car 1 through the side doors 10 and deposited on one of the two conveyors. That conveyor is actuated to cause the bulk material to move away from the center doors 10 toward the end of the car. Unloading the bulk material is just the reverse. The movement of the conveyors is reversed to cause the bulk material to move away from the ends of the car to the center doors 10 for unloading.

Granular material, such as grain, is loaded into the freight car 1 through the hatches 11 in the roof 7 after the center doors have been closed. During loading of the grain, the reciprocating conveyors 15 remain stationary. To unload the grain center discharge chute 17 under the floor is opened and the conveyors 15 are caused to move toward the center of the car, gradually moving the grain toward the center discharge chute 17 as shown in FIGS. 5-8. While gravity and the movement of the conveyors 15 will discharge most of the grain, a layer of grain will still remain on the surface of the reciprocating floor conveyors 15.

To discharge this residual grain, wiper bars 20, previously retained in pockets 21 in each of the end walls 6 of the car are released by a timed raising of retaining pins 30 and moved by movement of the reciprocating floor conveyor toward the center of the car sweeping the residual grain toward the discharge chute.

Figure 3:
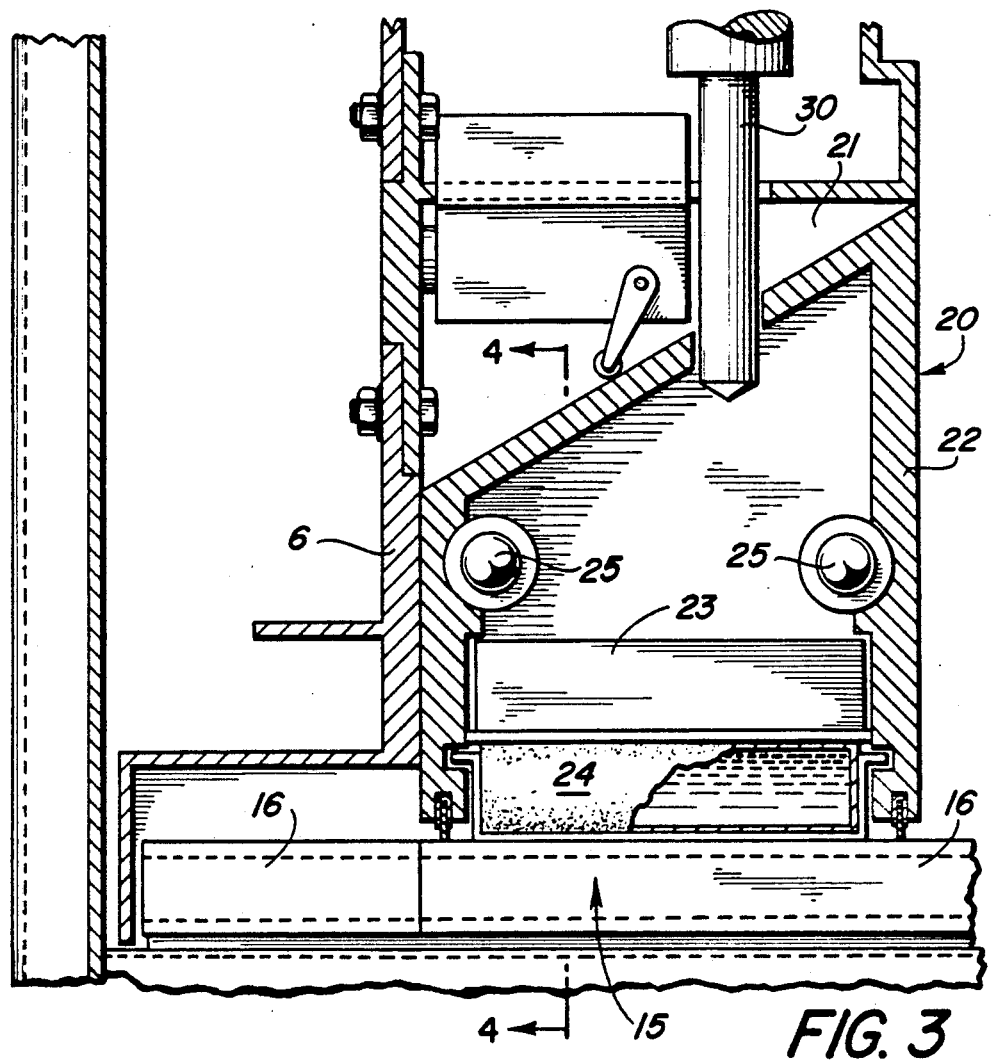
FIG. 3 is an elevational view in cross-section of the wiper assembly used in a preferred embodiment of the freight car of this invention.
Figure 4:
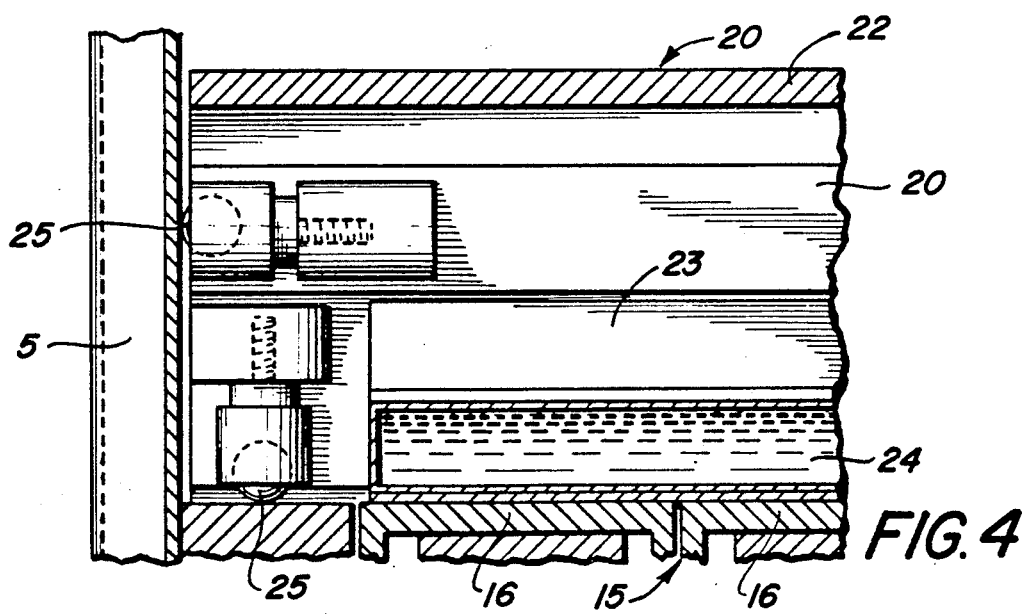
FIG. 4 is a sectional view taken along lines 4—4 of FIG. 3.
Figure 5:
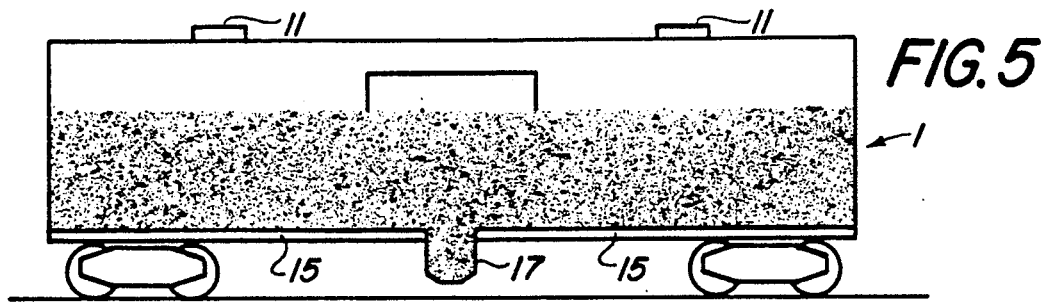
FIGS. 5–8 are diagrammatic illustrations to illustrate the sequence of grain unloading from the freight car of this invention.
Figure 6:
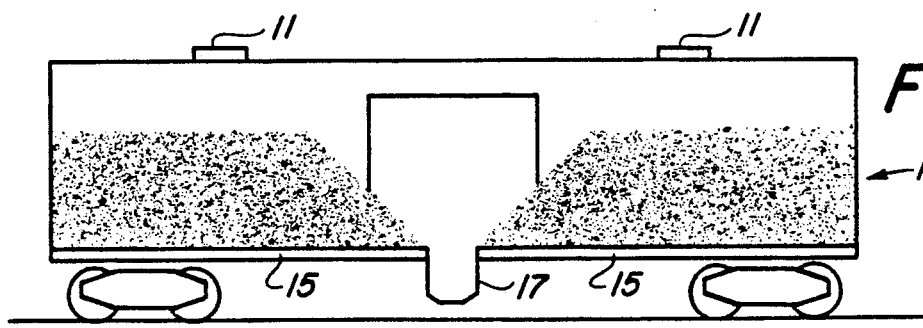
Figure 7:
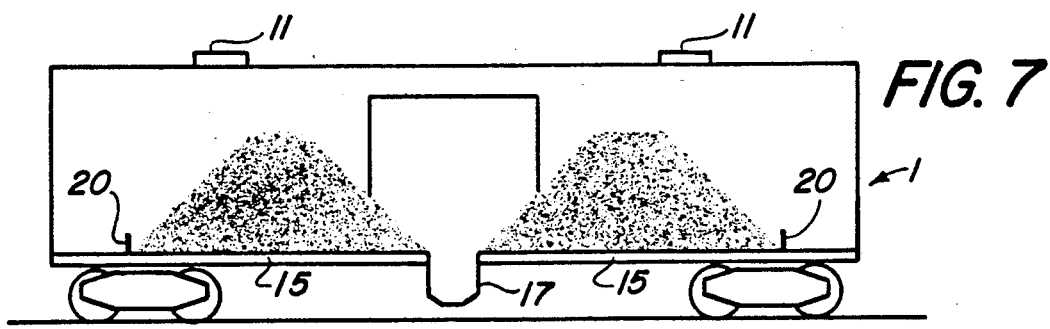
Figure 8:
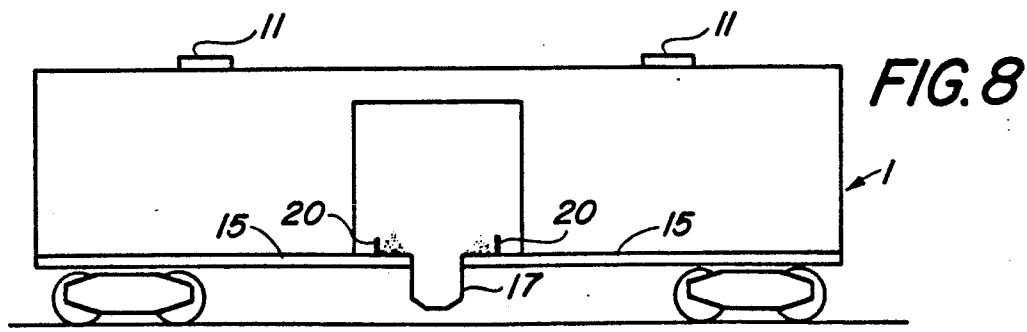

The wiper bar 20, as best shown in FIGS. 3 and 4, comprises a weighted metal channel 22 which extends across the full width of the car. The base of the channel consists of a heavy steel weight 23 resting on top of a fluid filled flexible bag 24 which rests on the reciprocating floor conveyors 15. Friction between the base of the wiper bar and the conveyor causes the wiper bar 20 to move longitudinally of the car to sweep the grain. The wiper bar 20 is kept from skewing during its movement by spring loaded side ball bearings 25 which bear against the lower portion of the sidewalls 5 and floor edges as shown in FIG. 4.

The power equipment system for operating the conveyors is primarily a stationary ground unit that part of is attachable to the car at its loading or unloading site.

I claim:

1. A railroad freight car floor comprising a pair of opposed, reciprocable, reversible conveyors and a discharge chute located beneath the opposed ends of said conveyors and in which each of the conveyors covers substantially the full width and one-half the length of the freight car floor.

2. A multipurpose enclosed railroad freight car comprising a structural undercarriage mounted on trucks, a pair of sidewalls, a pair of end walls, a roof, a floor and a discharge chute extending substantially the entire width of said car and located beneath said floor substantially midway between said end walls, said floor comprising a pair of opposed, reciprocable, reversible conveyors in which each of the conveyors covers substantially the full width and one-half the length of said freight car and the opposed ends of said conveyors terminate over said chute.

3. The railroad freight car of claim 2 including wiper means adapted to move longitudinally along the surface of each of said conveyors and in which the longitudinal movement of the wiper means is produced solely by friction against said conveyors.

4. The railroad freight car of claim 2 including wiper means adapted to move longitudinally along the surface of each of said conveyors and in which the base of said wiper means is a fluid filled flexible container.

5. A wiper adapted to move longitudinally along a floor comprised of a plurality of longitudinally extending, reciprocable floor planks in which the longitudinal movement of said wiper is produced solely by friction of said wiper against said reciprocable floor planks.

6. The wiper of claim 5 in which the base of the wiper is a fluid filled flexible container.

* * * * *